United States Patent
Lin et al.

(10) Patent No.: US 12,487,112 B2
(45) Date of Patent: Dec. 2, 2025

(54) LIQUID LEVEL GAUGE AND WAVEGUIDE SET

(71) Applicant: FENRI CO., LTD., New Taipei (TW)

(72) Inventors: Shueh-Ting Lin, New Taipei (TW); Yung-Yun Cheng, New Taipei (TW)

(73) Assignee: FENRI CO., LTD., New Taipei (TW)

( * ) Notice: Subject to any disclaimer, the term of this patent is extended or adjusted under 35 U.S.C. 154(b) by 331 days.

(21) Appl. No.: 18/165,588

(22) Filed: Feb. 7, 2023

(65) Prior Publication Data
US 2024/0263988 A1  Aug. 8, 2024

(51) Int. Cl.
*G01F 23/296* (2022.01)
(52) U.S. Cl.
CPC .................. *G01F 23/296* (2013.01)
(58) Field of Classification Search
CPC .................................. G01F 23/296
USPC ...................................... 73/290 R
See application file for complete search history.

(56) References Cited

FOREIGN PATENT DOCUMENTS

TW    M620117    * 11/2021    ............. G01F 23/28

OTHER PUBLICATIONS

TW Prior Art Lin et al (Year: 2021).*

* cited by examiner

*Primary Examiner* — Peter J Macchiarolo
*Assistant Examiner* — Rodney T Frank
(74) *Attorney, Agent, or Firm* — MUNCY, GEISSLER, OLDS & LOWE, P.C.

(57) ABSTRACT

A liquid level gauge and waveguide set includes a liquid level gauge installed on a vertical wall of a sewer, so that the liquid level detection module of the liquid level gauge emits radar waves or ultrasonic waves toward a sewage pipeline buried in a ditch on the bottom surface of the sewer for liquid level sensing, and a waveguide fixed on the vertical wall of the sewer with one end thereof facing the liquid level detection module. The waveguide has an exhaust branch pipe extending obliquely upwards from a top wall thereof. The radar wave or ultrasonic wave emitted by the liquid level detection module is reflected by the inner wall of the waveguide and touches the liquid surface covering the periphery of the sewage pipeline, and is transmitted back through the inner wall of the waveguide to the liquid level detection module to obtain liquid level data.

8 Claims, 4 Drawing Sheets

LIQUID LEVEL GAUGE AND WAVEGUIDE SET

BACKGROUND OF THE INVENTION

1. Field of the Invention

The present invention relates to liquid level measuring technology and more particularly, to a liquid level gauge and waveguide set, where the radar wave or ultrasonic wave emitted by the liquid level gauge is sent through the waveguide to the height closest to the liquid surface, and the radar wave or ultrasonic wave is also transmitted through the inner wall of the waveguide when it is transmitted back, so that the waveguide can isolate the interference of other facilities set up by sewer (such as: drop pipes, water baffles, water guide grooves and manhole steps) to make the liquid level height data sensed by the liquid level gauge extremely accurate, so that when these data are sent to the database of the default server, it is easy to judge the follow-up processing procedure based on the accurate data.

2. Description of the Related Art

Since the sewage sewer pipeline is buried underground, after long-term water supply, the sewage contains various impurities and oil, which will easily cause corrosion and deterioration of the pipeline. In addition, due to the stress of the rolling of various vehicles on the road, the pipeline is prone to water leakage, occurrence of unknown water infiltration, peeling, deformation, cracking, etc. More serious cases may cause road subsidence and collapse, and cause loss of people's lives and property.

In order to prevent the various problems of the above-mentioned sewage sewer, the conventional installation method is to directly install a water level gauge on the manhole anti-fall frame of the sewer for detection. The types of water level gauge detection are roughly divided into liquid level detection devices without display devices and liquid level detection devices with display devices. The liquid level detection device without display device includes a liquid level detection module and a controller. The liquid level detection module is divided into tuning fork type, submersible type, mechanical type, thermal diffusion type, capacitive type, radar wave type, ultrasonic type, photoelectric type, magnetostrictive type and thermal sensor type. Most of the water level gauges installed in sewage sewers use radar wave type. These radar wave water level gauges can make radar waves detect other structures of manholes, such as: drop pipes, water baffles, water guide grooves and manhole steps, etc. When the water level gauge signal is sent out, the radar signal will be scattered on the structure that is not the real water level, and the water level of the ditch cannot be effectively detected. When encountering water that is not in the ditch, the value will also be returned, causing the value to be inaccurate.

Therefore, how to solve the lack and inconvenience of the above-mentioned radar wave or ultrasonic water level gauge is the direction that relevant operators in this industry want to study and improve.

SUMMARY OF THE INVENTION

In view of the above-mentioned problems and deficiencies, the inventor collected relevant information, and after various evaluations and considerations, he designed this liquid level gauge and waveguide set.

It is the main object of the present invention to provide a liquid level gauge and waveguide set, which comprises a liquid level gauge and a waveguide. The liquid level gauge is installed on a vertical wall of a sewer, so that a liquid level detection module on the bottom side of the liquid level gauge emits radar waves or ultrasonic waves toward a sewage pipeline buried in a ditch on the bottom surface of the sewer for liquid level sensing. The waveguide has a hollow tube body installed and fixed on the vertical wall of the sewer. One end of the waveguide faces the liquid level detection module located at the liquid level gauge. The top wall of the waveguide is opposite to the liquid level gauge and extends obliquely upwards to form an exhaust branch pipe communicating with the inner space of the waveguide. The exhaust branch pipe can reduce and eliminate the air inside the waveguide when the liquid level rises, and prevent water vapor from condensing on the inner wall of the waveguide to affect the accuracy of the liquid level gauge. The other end of the waveguide faces the sewage pipeline, so that the radar wave or ultrasonic wave emitted by the liquid level detection module is reflected by the inner wall of the waveguide and touches the liquid surface covering the periphery of the sewage pipeline, and is transmitted back through the inner wall of the waveguide to the liquid level detection module to obtain liquid level data. With the setting of the waveguide mentioned above, the radar waves or ultrasonic waves emitted by the liquid level gauge can be concentrated and sent to the height closest to the liquid surface, and when the radar wave or ultrasonic wave is returned, it is also conducted through the inner wall of the waveguide, and the waveguide can be used to isolate the interference of other facilities installed by the sewer (such as: drop pipes, water baffles, water guides and manhole steps) to make the liquid level height data sensed by the liquid level gauge extremely accurate, so that when these data are sent to the database of the default server, it is easy to judge the follow-up processing procedure based on the accurate data.

It is another object of the present invention to provide a liquid level gauge and waveguide set, wherein the exhaust branch pipe of the waveguide can be connected to the opening of a commercially available fire hose, and high-pressure water flow can be injected to clean the dirt and dust attached to the inner wall of the waveguide, and the accuracy of the liquid level gauge measurement can be maintained, so that the service life of the waveguide is extended.

It is still another object of the present invention to provide a liquid level gauge and waveguide set, wherein the waveguide is fixed on the vertical wall by plural fixing clips in the shape of "ω". The vertical wall refers to a retaining wall made of cement concrete, a top ring embedded in the road is provided on the top side of the retaining wall, and a manhole cover is provided on the inner edge of the top ring for maintenance personnel to enter and exit.

It is still another object of the present invention to provide a liquid level gauge and waveguide set, wherein the single length range of the waveguide is 4~5 meters, and when the length of the waveguide is set to exceed 4~5 meters according to the requirements, it is necessary to use multiple waveguides in series to implement.

It is still another object of the present invention to provide a liquid level gauge and waveguide set, wherein the waveguide comprises, from top to bottom, a head pipe facing the liquid level gauge, and an end pipe facing the sewage pipeline. The head pipe can be directly connected in series with the end pipe, or at least one connecting pipe can be arranged between the head pipe and the end pipe according to the length requirement. The connecting pipe and the end pipe each have a top side thereof provided with a connecting portion with a cup-shaped expansion pipe diameter that is to be sleeved on the pipe above.

It is still another object of the present invention to provide a liquid level gauge and waveguide set, wherein the included angle between the waveguide and the exhaust branch pipe is between 15 and 75 degrees.

It is still another object of the present invention to provide a liquid level gauge and waveguide set, wherein the waveguide has a chamfer on the bottom side thereof opposite to the sewage pipeline, and an included angle between 30 and 75 degrees is defined between the oblique section of the chamfer and the horizontal line.

DETAILED DESCRIPTION OF THE PREFERRED EMBODIMENT

Figure 1:
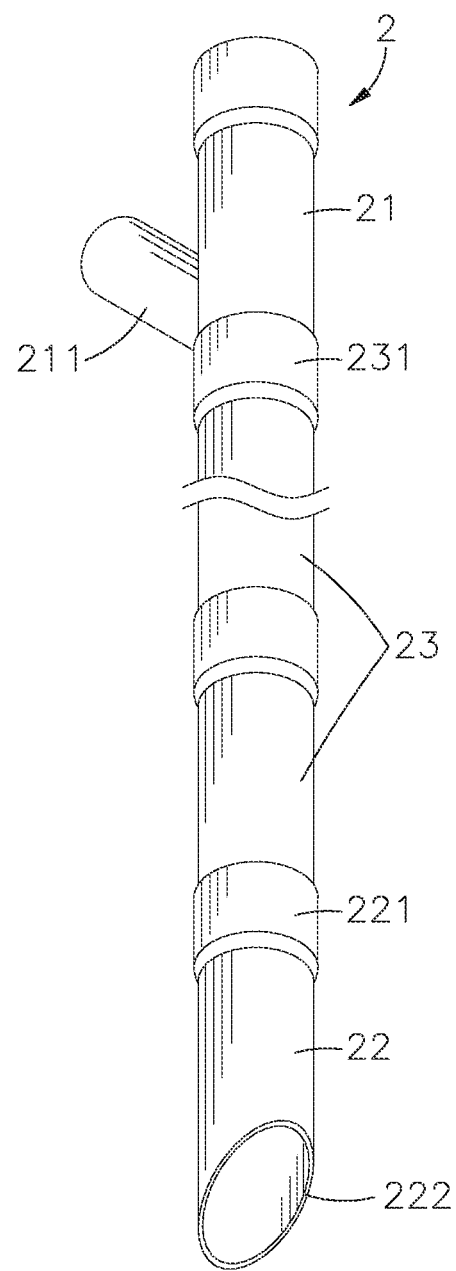
FIG. 1 is a three-dimensional appearance diagram of the waveguide of the present invention.
Figure 2:
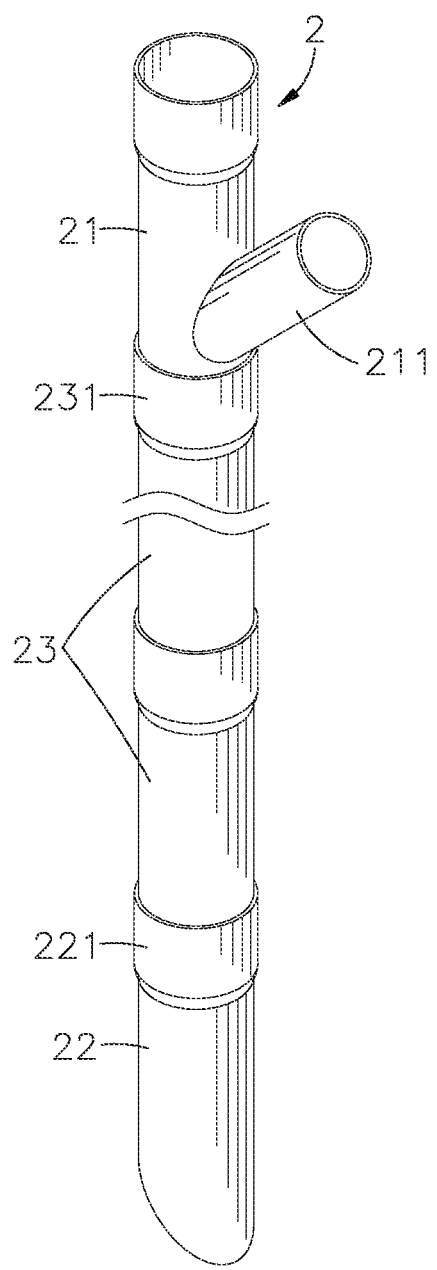
FIG. 2 is a three-dimensional appearance diagram of the waveguide of the present invention from another perspective.

Please refer to FIGS. 1-4, which are respectively the three-dimensional appearance diagram of the waveguide of the present invention, the three-dimensional appearance diagram of the waveguide from another perspective, the side sectional view of the waveguide for cleaning, and the side sectional view of the waveguide installed on the vertical wall of the sewer. As can be clearly seen from the drawings, the present invention mainly comprises: a liquid level gauge 1 and a waveguide 2, and the detailed structure and connection relationship of the aforementioned components are as follows:

The liquid level gauge 1 is installed on a vertical wall 31 of a sewer 3. The type of the liquid level gauge 1 is radar wave liquid level gauge or ultrasonic wave liquid level gauge. A liquid level detection module 11 on the bottom side of the liquid level gauge 1 emits radar waves or ultrasonic waves toward a sewage pipeline 321 buried in a ditch 320 on the bottom surface 32 of the sewer 3 for liquid level sensing. The aforementioned liquid level gauge 1 is installed on a manhole anti-drop frame (not shown) set on the vertical wall 31. However, the installation position of the liquid level gauge 1 is not fixed, and the installation on the manhole anti-drop frame is just an example, not self-limiting. The sewer 3 is not limited to sewage sewer, it can also be a rainwater channel for collecting rainwater. The implementation of such simple changes is also within the protection scope of the present invention.

The waveguide 2 has a hollow tube body installed and fixed on the vertical wall 31 of the sewer 3. One end of the waveguide 2 faces the liquid level detection module 11 located at the liquid level gauge 1. The top wall of the waveguide 2 is opposite to the liquid level gauge 1 and extends obliquely upwards to form an exhaust branch pipe 211 communicating with the inner space of the waveguide 2. The exhaust branch pipe 211 can reduce and eliminate the air inside the waveguide 2 when the liquid level rises, and prevent water vapor from condensing on the inner wall of the waveguide 2 to affect the accuracy of the liquid level gauge 1. The other end of the waveguide 2 faces the sewage pipeline 321, so that the radar wave or ultrasonic wave emitted by the liquid level detection module 11 is reflected by the inner wall of the waveguide 2 and touches the liquid surface (not shown) covering the periphery of the sewage pipeline 321, and is transmitted back through the inner wall of the waveguide 2 to the liquid level detection module 11 to obtain liquid level data.

The above-mentioned waveguide 2 is fixed on the vertical wall 31 by multiple fixing clips 33 in the shape of "Ω". The vertical wall 31 refers to a retaining wall made of cement concrete. A top ring 34 embedded in the road is provided on the top side of the retaining wall, and a manhole cover 35 for maintenance personnel to enter and exit is provided on the inner edge of the top ring 34. The bottom surface 32 of the sewer 3 is formed with a guide slope 322 extending from both sides of the ditch 320 to the vertical wall 31.

Figure 3:
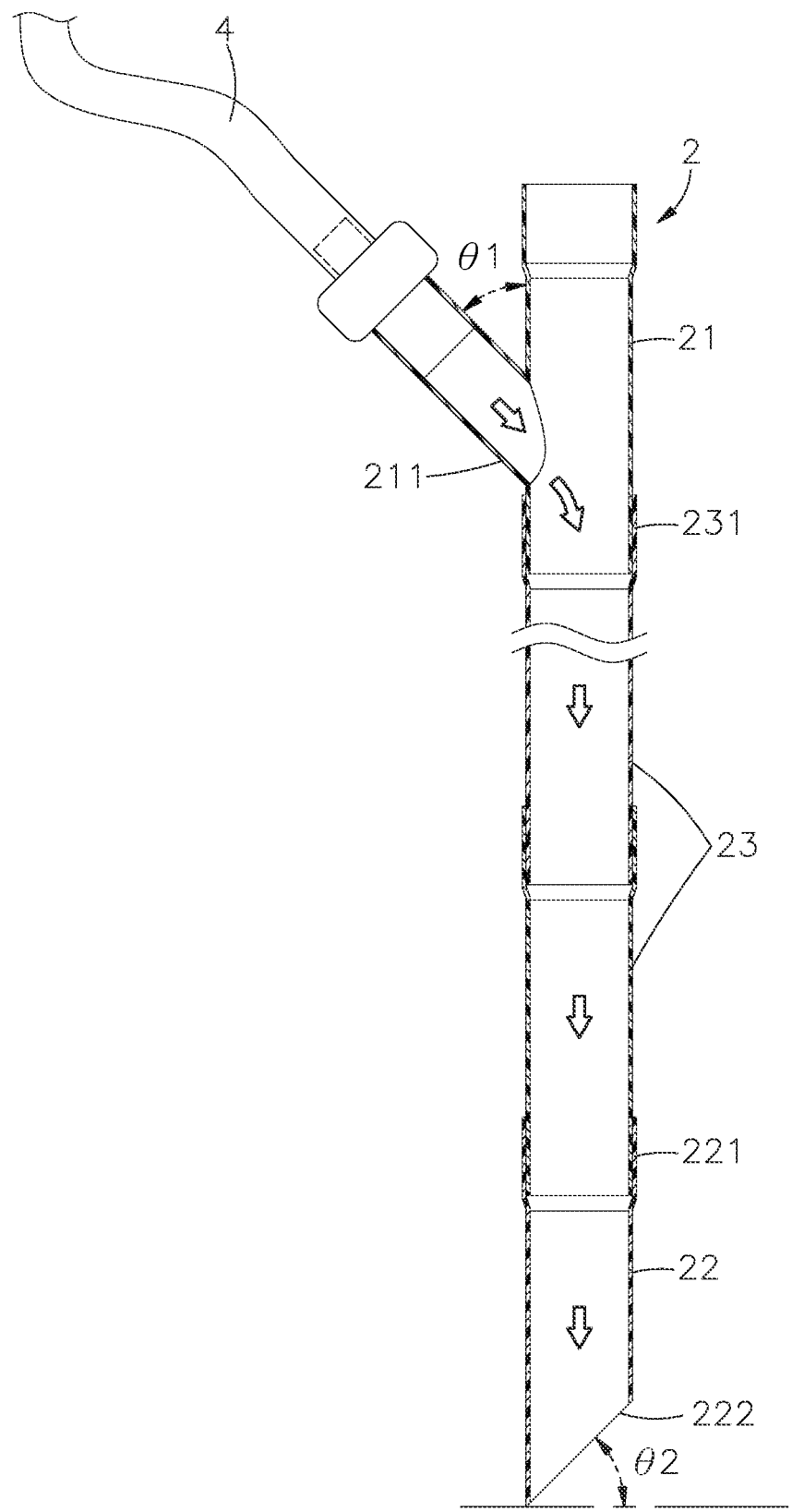
FIG. 3 is a side sectional view of the waveguide of the present invention for cleaning.
Figure 4:
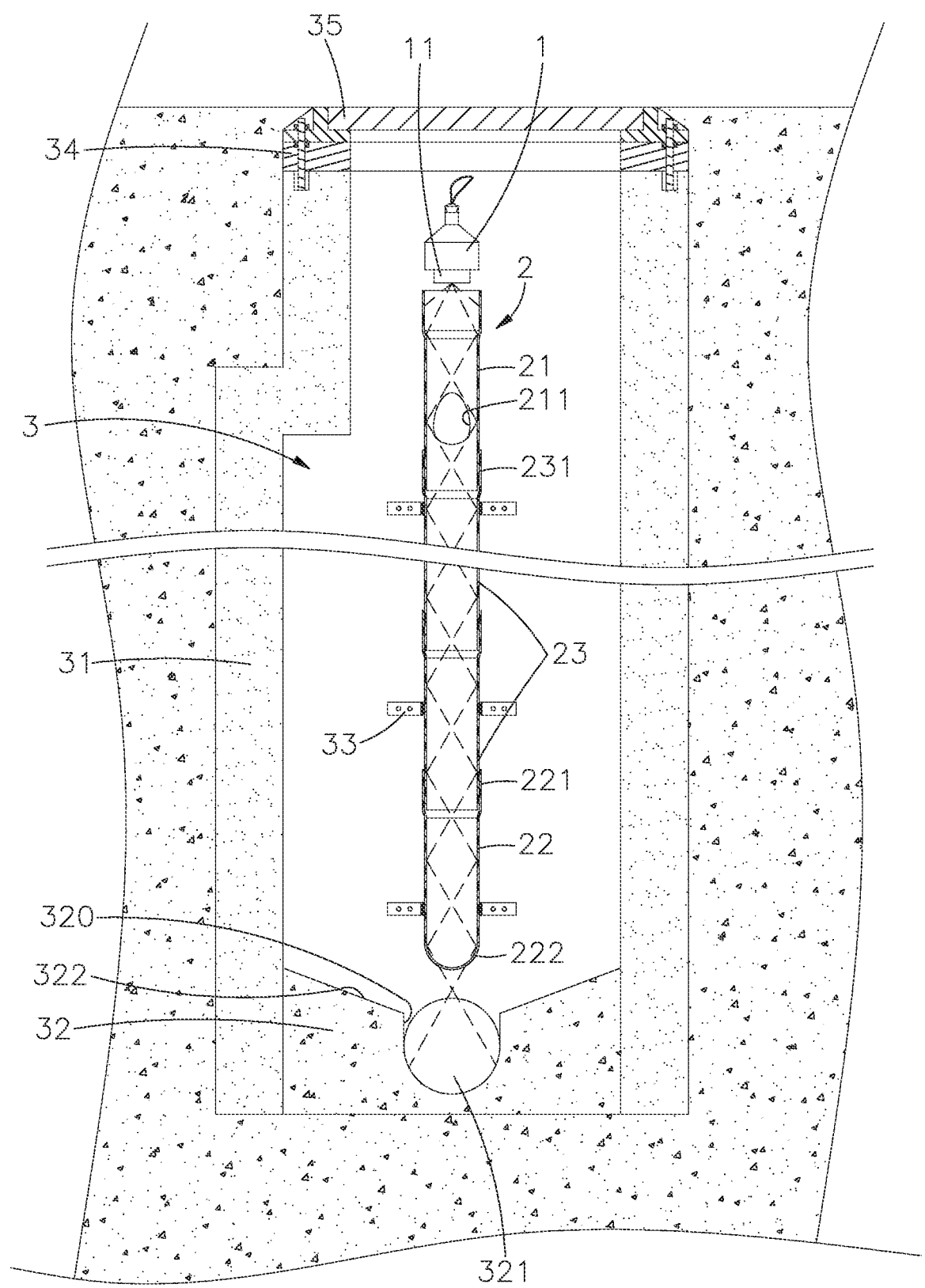
FIG. 4 is a side sectional view of the waveguide of the present invention installed on the vertical wall of the sewer.

As shown in FIG. 3, the single length range of the above-mentioned waveguide 2 is 4~5 meters. When the length of the waveguide 2 is set to exceed 4~5 meters according to the requirements, it is necessary to use multiple waveguides 22 in series to implement. The waveguide 2 includes, from top to bottom, a head pipe 21 facing the liquid level gauge 11, and an end pipe 22 facing the sewage pipeline 321. The head pipe 21 can be directly connected in series with the end pipe 22, or at least one connecting pipe 23 is arranged between the head pipe 21 and the end pipe 22 according to the length requirement. The top sides of the connecting pipe 23 and the end pipe 22 are each provided with a connecting portion 231 or 221 with a cup-shaped expansion pipe diameter that can be sleeved on the upper pipe body. Of course, those who are familiar with this technique can also directly use a two-way joint with a pipe diameter larger than the waveguide 2 as the connecting structure of multiple waveguides 2, and this simple implementation change is also within the protection scope of the present invention. The included angle θ1 between the head pipe 21 of the waveguide 2 and the exhaust branch pipe 211 ranges from 15 to 75 degrees. In addition, the bottom side of the waveguide 2 has a chamfer 222 opposite to the sewage pipeline 321, and there is an included angle θ2 between the oblique section of the chamfer 222 and the horizontal line, and the range of the included angle θ2 is between 30 and 75 degrees. The waveguide 2 is made of plastic or metal material, and the preferred implementation of the plastic material is polyvinyl chloride (PVC), and the preferred implementation of the metal material is stainless steel.

The exhaust branch pipe 211 of the waveguide 2 can be connected to the opening of the exhaust branch pipe 211 through the general commercially available fire hose 4 through the front joint. In this way, it can inject high-pressure water to clean the dirt and dust attached to the inner wall of the waveguide 2, and maintain the measurement accuracy of the liquid level gauge 1, so that the service life of the waveguide 2 can be extended.

The main feature of the present invention is that the radar wave or ultrasonic wave emitted by the liquid level gauge 1 can be concentrated and sent to the height closest to the liquid level by setting the waveguide 2, and when the radar wave or ultrasonic wave returns, it also conducts a conduction through the inner wall of the waveguide 2. The waveguide 2 can be used to isolate the interference of other facilities set by sewer (not shown, such as: drop pipe, water baffle, water guide groove and manhole step). This makes the liquid level height data sensed by the liquid level gauge 1 extremely accurate, so that when these data are sent to the database of the default server, it is easy to judge the follow-up processing procedure based on the accurate data.

What the invention claimed is:

1. A liquid level gauge and waveguide set, comprising:
    a liquid level gauge installed on a vertical wall of a sewer, so that a radar wave or ultrasonic wave emitted by a liquid level detection module of said liquid level gauge is directed towards a sewage pipeline embedded in a ditch on a bottom surface of said sewer for liquid level sensing; and
    a waveguide comprising a hollow tube body installed and fixed on said vertical wall of said sewer with one end thereof facing said liquid level detection module of said liquid level gauge, an exhaust branch pipe extending obliquely upward from a top wall of said waveguide opposite to said liquid level gauge and communicating with the inner space of said waveguide, said exhaust branch pipe being used to reduce and eliminate the air inside said waveguide when the liquid level rises, and prevent water vapor from condensing on the inner wall of said waveguide to affect the accuracy of said liquid level gauge, said waveguide having an opposite end thereof facing said sewage pipeline, so that the radar wave or ultrasonic wave emitted by said liquid level detection module is reflected by the inner wall of said waveguide and touches the liquid surface covering the periphery of said sewage pipeline, and is transmitted back through the inner wall of said waveguide to said liquid level detection module to obtain liquid level data.

2. The liquid level gauge and waveguide set as claimed in claim 1, wherein said waveguide is fixed on said vertical wall by multiple fixing clips in the shape of "Ω"; said vertical wall is a retaining wall made of cement concrete; a top ring embedded in the road is provided on a top side of said retaining wall, and a manhole cover for maintenance personnel to enter and exit is provided on an inner edge of said top ring.

3. The liquid level gauge and waveguide set as claimed in claim 1, wherein the single length range of said waveguide is 4~5 meters, and when the length of said waveguide is set to exceed 4~5 meters according to the requirements, multiple waveguides are necessary to be used in series to implement.

4. The liquid level gauge and waveguide set as claimed in claim 3, wherein said waveguide comprises, from top to bottom, a head pipe facing said liquid level gauge, and an end pipe facing said sewage pipeline, said head pipe being to be directly connected in series with said end pipe, or at least one connecting pipe being to be arranged between said head pipe and said end pipe according to the length requirement, said connecting pipe and said end pipe each having a top side thereof provided with a connecting portion with a cup-shaped expansion pipe diameter that is to be sleeved on the pipe above.

5. The liquid level gauge and waveguide set as claimed in claim 1, wherein an included angle between said head pipe of said waveguide and said exhaust branch pipe ranges from 15 to 75 degrees.

6. The liquid level gauge and waveguide set as claimed in claim 1, wherein said waveguide has a chamfer on a bottom side thereof opposite to said sewage pipeline, and an included angle between 30 and 75 degrees is defined between the oblique section of said chamfer and the horizontal line.

7. The liquid level gauge and waveguide set as claimed in claim 1, wherein said waveguide is selectively made of plastic or metal material, and the preferred implementation of the plastic material is polyvinyl chloride (PVC), and the preferred implementation of the metal material is stainless steel.

8. The liquid level gauge and waveguide set as claimed in claim 1, wherein said bottom surface of said sewer is formed with a guide slope extending from both sides of said ditch to said vertical wall.

* * * * *